United States Patent
Günnemann-Gholizadeh et al.

(10) Patent No.: US 12,380,339 B2
(45) Date of Patent: Aug. 5, 2025

(54) AUTOMATICALLY GENERATING TRAINING DATA OF A TIME SERIES OF SENSOR DATA

(71) Applicant: Siemens Aktiengesellschaft, Munich (DE)

(72) Inventors: Nikou Günnemann-Gholizadeh, Munich (DE); Filip Galabov, Munich (DE)

(73) Assignee: Siemens Aktiengesellschaft, Munich (DE)

(*) Notice: Subject to any disclaimer, the term of this patent is extended or adjusted under 35 U.S.C. 154(b) by 75 days.

(21) Appl. No.: 18/032,379

(22) PCT Filed: Oct. 27, 2021

(86) PCT No.: PCT/EP2021/079752
§ 371 (c)(1),
(2) Date: Apr. 18, 2023

(87) PCT Pub. No.: WO2022/090275
PCT Pub. Date: May 5, 2022

(65) Prior Publication Data
US 2023/0351214 A1    Nov. 2, 2023

(30) Foreign Application Priority Data
Oct. 29, 2020    (EP) .................... 20204678

(51) Int. Cl.
*G06N 5/022*    (2023.01)
*G05B 23/02*    (2006.01)

(52) U.S. Cl.
CPC ......... *G06N 5/022* (2013.01); *G05B 23/0245* (2013.01); *G05B 2223/02* (2018.08)

(58) Field of Classification Search
CPC . G05B 23/0245; G05B 2223/02; G06N 5/022
See application file for complete search history.

(56) References Cited

U.S. PATENT DOCUMENTS 9,691,395 B1 * 6/2017 Sieracki ................. G10L 17/04
2004/0260521 A1 12/2004 Aggarwal
(Continued)

FOREIGN PATENT DOCUMENTS

CN    110121682 A    8/2019
CN    111183510 A    5/2020
(Continued)

OTHER PUBLICATIONS

Deldari, S. et al., "ESPRESSO: Entropy and ShaPe awaRe timE-Series SegmentatiOn for Processing Heterogenous Sensor Data", https://dl.acm.org/doi/abs/10.1145/3411832, Sep. 4, 2020 (Year: 2020).*
(Continued)

*Primary Examiner* — Alexey Shmatov
*Assistant Examiner* — Devika S Maharaj
(74) *Attorney, Agent, or Firm* — Schmeiser, Olsen & Watts, LLP

(57) ABSTRACT

Assistance device for automatically generating training data of a time series of sensor data, further on called temporal sensor data, applied to train an Artificial Intelligence system used for detecting anomalous behavior of a technical system, including a processor configured to perform—obtaining historical temporal sensor data, dividing the historical temporal sensor data into a temporal sequence of segments and assigning one segment type out of several different segment types to each segment, iteratively for each segment, determining a neighborhood pattern of segment types, determining the most frequently occurring neighborhood pattern from all determined neighborhood patterns as reference pattern for normal operation of the technical system, —selecting a subsequence of segments out of the historical temporal sensor data, which is ordered according to the reference pattern, and—outputting the subsequence of segments for applying as training data.

14 Claims, 5 Drawing Sheets

(56) References Cited

U.S. PATENT DOCUMENTS

Figure 1:
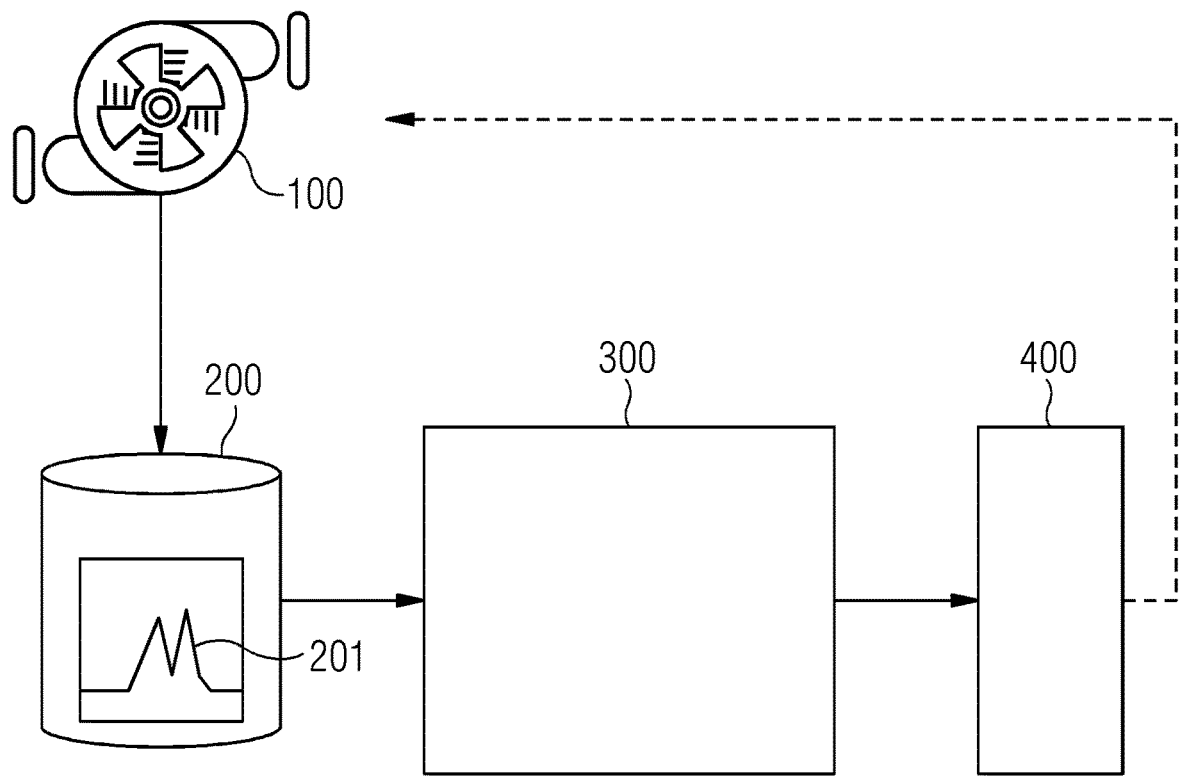

| | | | |
|---|---|---|---|
| 2015/0253366 A1 | 9/2015 | Agarwal et al. | |
| 2017/0147930 A1 | 5/2017 | Bellala et al. | |
| 2017/0184643 A1 | 6/2017 | Homma et al. | |
| 2018/0164794 A1 | 6/2018 | Nikovski et al. | |
| 2019/0108422 A1 | 4/2019 | Cantwell | |
| 2020/0081817 A1* | 3/2020 | Gross | G06N 20/00 |
| 2020/0082220 A1* | 3/2020 | Cohen | G06N 3/08 |
| 2020/0125995 A1* | 4/2020 | Wang | G06N 20/00 |
| 2020/0336499 A1* | 10/2020 | Kulkarni | G06F 18/29 |
| 2021/0065059 A1* | 3/2021 | Song | G06N 3/044 |

FOREIGN PATENT DOCUMENTS

| | | |
|---|---|---|
| EP | 2916260 A1 | 9/2015 |
| EP | 3671576 A1 | 6/2020 |
| EP | 3706047 A1 | 9/2020 |
| EP | 3706048 A1 | 9/2020 |

OTHER PUBLICATIONS

Li, J. et al., "Multivariate time series anomaly detection: A framework of Hidden Markov Models", https://www.sciencedirect.com/science/article/pii/S1568494617303782 (Year: 2017).*

International Search Report and Written Opinion for PCT/EP2021/079752, mailed on Feb. 8, 2022.

* cited by examiner

AUTOMATICALLY GENERATING TRAINING DATA OF A TIME SERIES OF SENSOR DATA

CROSS-REFERENCE TO RELATED APPLICATIONS

This application claims priority to PCT Application No. PCT/EP2021/079752, having a filing date of Oct. 27, 2021, which claims priority to EP Application No. 20204678.5, having a filing date of Oct. 29, 2020, the entire contents all of which are hereby incorporated by reference.

FIELD OF TECHNOLOGY

The following relates to an assistance device and a method for automatically generating training data of a time series of sensor data, further on called temporal sensor data, applied to train an Artificial Intelligence system used for detecting anormal behavior of a technical system.

BACKGROUND

In various technical fields, there is a need to monitor the operation of technical systems. For example, in the field of oil or gas production, heavy industries, transportation and automation systems, a large number of machines, drives and also controllers are monitored to detect or even predict abnormal operation and thereby enable, e.g., preventive maintenance to insure high availability of the technical systems.

It is desirable to utilize a monitoring mechanism which is, at least in part, based on Artificial Intelligence, further abbreviated by AI, to efficiently monitor a large number of machines. Such AI based mechanisms analyze time series of data obtained by various sensors monitoring a plurality of parameters of a machine, automatically identify anomalous behavior and trigger measures to resolve issues causing the anomalous behavior e.g. by issuing a warning to an operator. EP3706048A1 discloses a further AI based anomaly detection and prediction method.

Artificial Intelligence models for detecting anomalies, e.g., machine learning models or neural networks are trained by time series of sensor data which characterize the operations data of the monitored machine. The performance of these applied Artificial Intelligence models and the quality of the output depend mostly on the selected data being used for training the Artificial Intelligence model.

To train such an AI model, it is typically required to provide manually labelled training data. In such labeled data, labels identify time windows in which the time series data exhibit a specific type of dynamic, i.e., similar data distribution, which is indicative of an anomalous or regular behavior. Manual labelling is a tedious process. Further a manual setting of the width of the time windows is often inaccurate and typically resolves in setting the time windows too wide, thus not covering only the behavior of interest, but also other data.

EP3671576 A1 discloses a method to determine time windows, further on called segments, in time series data of a system component. Time series data received from at least one component or from at least one sensor are divided into segments of time series. Segments showing similar features, i.e., data distribution are assigned to the same cluster of several clusters by using a Hidden-Markov-model. The clusters are built based on predefined probabilistic description models.

In many application fields, the selection of suitable data for training an AI system has been done manually or based on random principals, e.g., shuffling methods, or by selecting parts of overall data of available time series of data of the machine to be monitored. In shuffling methods, the overall time series data is divided into several segments and the segments are reassembled in interchanged order to build a new time series data similar to the original overall time series data.

US 2017/184643 A1 discloses a training data generation device for providing training data for an electrical device monitoring system. The electrical device monitoring system determines the power consumption of single electrical devices from a sum measurement of the power consumption of a multitude of different electrical devices. Groups, i.e., units in which representative power values and feature amounts are determined, are set so that power consumption values are shown when an electrical device is used in a normal state. The representative power value and the feature amount are determined for each group. Groups including power consumption values rarely shown when an electrical device is used in the normal form are not set, and training date corresponding to the power consumption values is not generated. The number of pieces of training data is reduced, but training data is generated corresponding to the power consumption value with a high rate of occurrence. However, these processes are very time consuming and susceptible to wrong or unsuitable data selection.

Therefore, it is the object of the present application to generate training data of time series of data which represent normal behavior of the monitored technical system with a high probability in a fast and reliable way.

SUMMARY

An aspect relates to an assistance device for automatically generating training data of a time series of sensor data, further called temporal sensor data, applied to train an Artificial Intelligence system used for detecting anomalous behavior or of a technical system, comprising at least one processor configured to perform
- obtaining at least one historical temporal sensor data measured at said or similar technical system,
- dividing the historical temporal sensor data into a temporal sequence of segments and assigning one segment type out of several different segment types to each segment, wherein each segment type is characterized by similar data distribution of temporal sensor data,
- iteratively for each segment, determining a neighborhood pattern of segment types comprising of the segment type of a first number of adjacent proceeding segment, the segment type of said, i.e., the considered segment and the segment types of a second number of adjacent subsequent segments,
- determining the most frequently occurring neighborhood pattern from all determined neighborhood patterns as reference pattern for a normal operation of the technical system,
- selecting a subsequence of segments out of the historical temporal sensor data, which is ordered according to the reference pattern, and
- outputting the subsequence of segments for applying as training data.

The Artificial Intelligence system, further on named AI system, is a device running an Artificial Intelligence based model, for example a machine learning model to detect anormal behavior of a technical system. The technical system can be any mechanical apparatus, like a pump, turbine, press, motor, drive, but it can also be an electronical apparatus like a control device, a field devices or other devices in an automation plant. Historical temporal sensor data reflect the technical system in operation over a period of time for example of days, months or years running in common, mostly normal operation modes. A temporal sequence of segments consists of consecutive segments without any gap in time between two segments. A neighborhood pattern is determined to be a reference pattern, i.e., the most frequently occurring neighborhood pattern, if a ratio of the neighborhood pattern related to all neighborhood patterns determined in historical temporal sensor data is equal to or exceeds a predefined threshold. Outputting the subsequence of segments for applying as training data means in other words, providing the subsequence of segments as output of the assistance device to be used as input temporal sensor data to train the AI system.

Selecting a subsequence of segments out of the historical temporal sensor data, which is ordered according to the reference pattern is based on the assumption that a technical system is working the predominant part in time in normal operation. A technical system working in normal operation could be interpreted as a sum of successive operation modes where the data distribution changes but the operation modes appear in the same order and repeatedly. Thus, determining the most frequently occurring neighborhood pattern and selecting a subsequence of segments out of the historical temporal data which is ordered according to these reference patterns is very likely temporal sensor data reflecting the technical system in normal operation. Therefore, using these selected subsequences of segments for training the Artificial Intelligence system shows a high probability to reflect the wanted operation mode. The device has also the advantage, that interruptions of the normal mode are filtered out and do not appear in the selected subsequence which is output and used as training data. This ensures the Artificial Intelligence system being properly trained on the normal mode temporal sensor data without misleading disruptive sensor data distributions.

According to an embodiment the assistance device further comprises a user interface configured to receive the first and second number from a user of the device.

This allows to tune and optimize the training data generation depending on the input historical sensor data and different technical systems to be monitored by the trained AI system. If the technical system in normal operation shows few different modes the first and second number can be set to a low number, whereas for a technical system showing several modes of normal operation the user can input a higher first and second number. The first and second number can have the same value or different values.

According to embodiments of the invention, the assistance device is configured such that the neighborhood pattern consists of at least two different segment types.

This allows the definition of simple neighborhood patterns in the historical temporal sensor data. Accordingly, at most one of the first and second numbers can have the value zero.

According to a further embodiment the dividing of historical temporal sensor data into the temporal sequence of segments and the assigning of one segment type out of several different segment types to each segment is performed by applying an unsupervised segmentation algorithm on the historical temporal sensor data.

Unsupervised segmentation algorithms are based on unsupervised clustering algorithms adapted for time series data. Unsupervised segmentation algorithms automatically determine clusters of segments showing similar data distribution inside the segment. Types of clusters are not predefined, but they are determined by the unsupervised dividing algorithm itself. A segment itself consists of consecutive temporal sensor data points. As a result of this feature the historical temporal sensor data consists of consecutive segments of temporal sensor data, wherein neighboring segments are of different segment types.

According to a further embodiment the assistance device is configured such that the selecting of this subsequence of segments is performed by applying a greedy algorithm depending on the neighborhood pattern on the historical temporal sensor data.

A greedy algorithm is any algorithm that follows a problem-solving heuristic of making a locally optimal choice at each stage. The Greedy algorithm provides fast processing of allocating sequences according to a predefined pattern, here the reference pattern.

According to a further embodiment the segments of each segment type can be of various temporal length.

This takes into account, that only the order of the segment types of segments is of relevance but not the duration in time of each of the segment as such.

According to a further embodiment several subsequences ordered according to the same reference pattern are concatenated to an extended sequence and the extended subsequence is output as training data.

This provides longer training data in time and comprises more variations of the training data with respect to the temporal length of the segments.

According to a further embodiment the assistance device is configured such that at least two different reference patterns are determined and a separate subsequence of segments is selected for each of the different reference pattern and each of these subsequences output, wherein each subsequence comprises segments ordered according to the respective reference pattern.

This provides the advantage that more variations in the historical temporal sensor data are included in the training data. These variations comply to different normal operation modes, i.e., sub-modes of normal operation of the technical which show different data structure.

According to a further embodiment the assistance device is configured such that subsequences of different reference patterns are concatenated to form a mixed extended subsequence and the mixed extended subsequence is issued as output.

Especially in cases where the segments according to one reference pattern are very short in time subsequences of long-time duration can be assembled by such a concatenation.

According to a further embodiment the assistance device is configured such that connecting parts of two concatenated subsequences of a mixed extended subsequence of temporal sensor data are re-sampled to smoothen the transition between the concatenated subsequences.

This prevents any discontinuity and/or disruptions in the output segments, i.e., training data, leading to misinterpretation in the Artificial Intelligence system.

A further aspect relates to a training system for training an Artificial Intelligence system used for detecting anomalous behavior of technical system, comprising of a data provision unit configured to prepare and provide historical temporal sensor data which was measured at said or similar technical system, an assistance device with features mentioned before, and an Artificial Intelligence system comprising at least one processor configured for receiving the subsequence of segments and applying the subsequence of segments to train an Artificial Intelligence function for detecting anomalous behavior.

A further aspect relates to a method for automatically generating training data of a time series of sensor data, further on called temporal sensor data, applied to train an Artificial Intelligence system used for a detecting anomalous behavior of a technical system, comprising obtaining at least one historical temporal sensor data measured at set or similar technical system, dividing the historical temporal sensor data into a temporal sequence of segments and assigning one segment type out of several different segment types to each segment, wherein each segment type is characterized by similar data distribution of temporal sensor data, iteratively for each segment, determining a neighborhood pattern of segment types comprising of the segment type of a first number of adjacent preceding segments and the segment type of said, i.e., the considered segment and the segment types of a second number of adjacent subsequent segments, determining the most frequently occurring neighborhood pattern from all determined neighborhood patterns as reference pattern for normal operation of the technical system, selecting a subsequence of segments out of the historical temporal sensor data which is ordered according to the reference pattern and outputting the subsequence of segments for applying a training data.

A further aspect relates to a computer program product (non-transitory computer readable storage medium having instructions, which when executed by a processor, perform actions) directly loadable into the internal memory of a digital computer, comprising software code portions for performing the steps of the method when that product is run on the digital computer.

BRIEF DESCRIPTION

Figure 2:
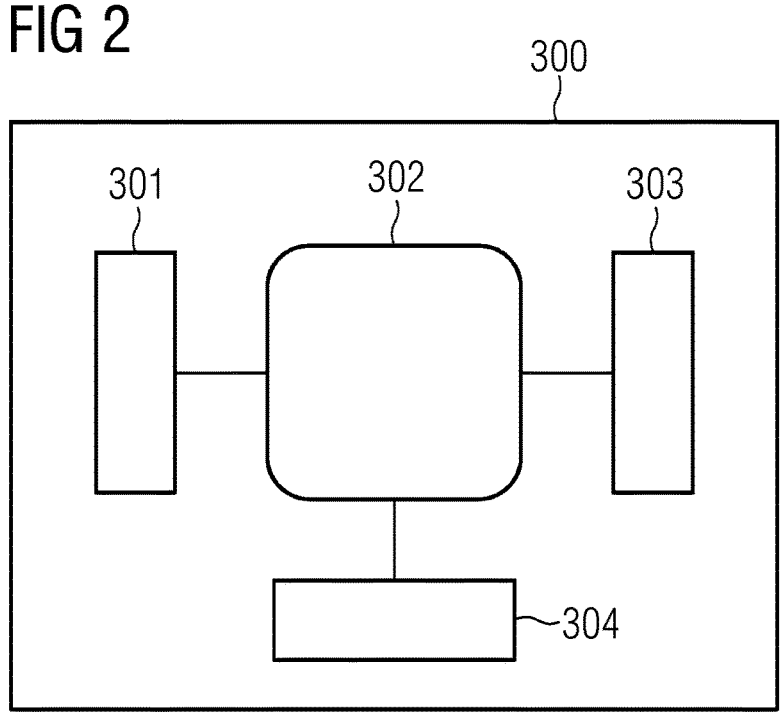
Figure 3:
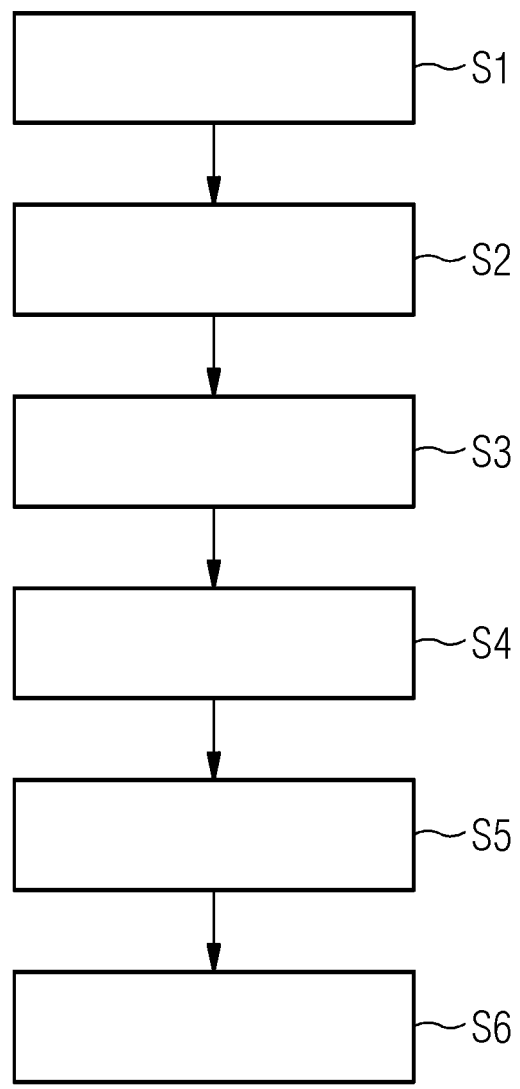
Figure 4:
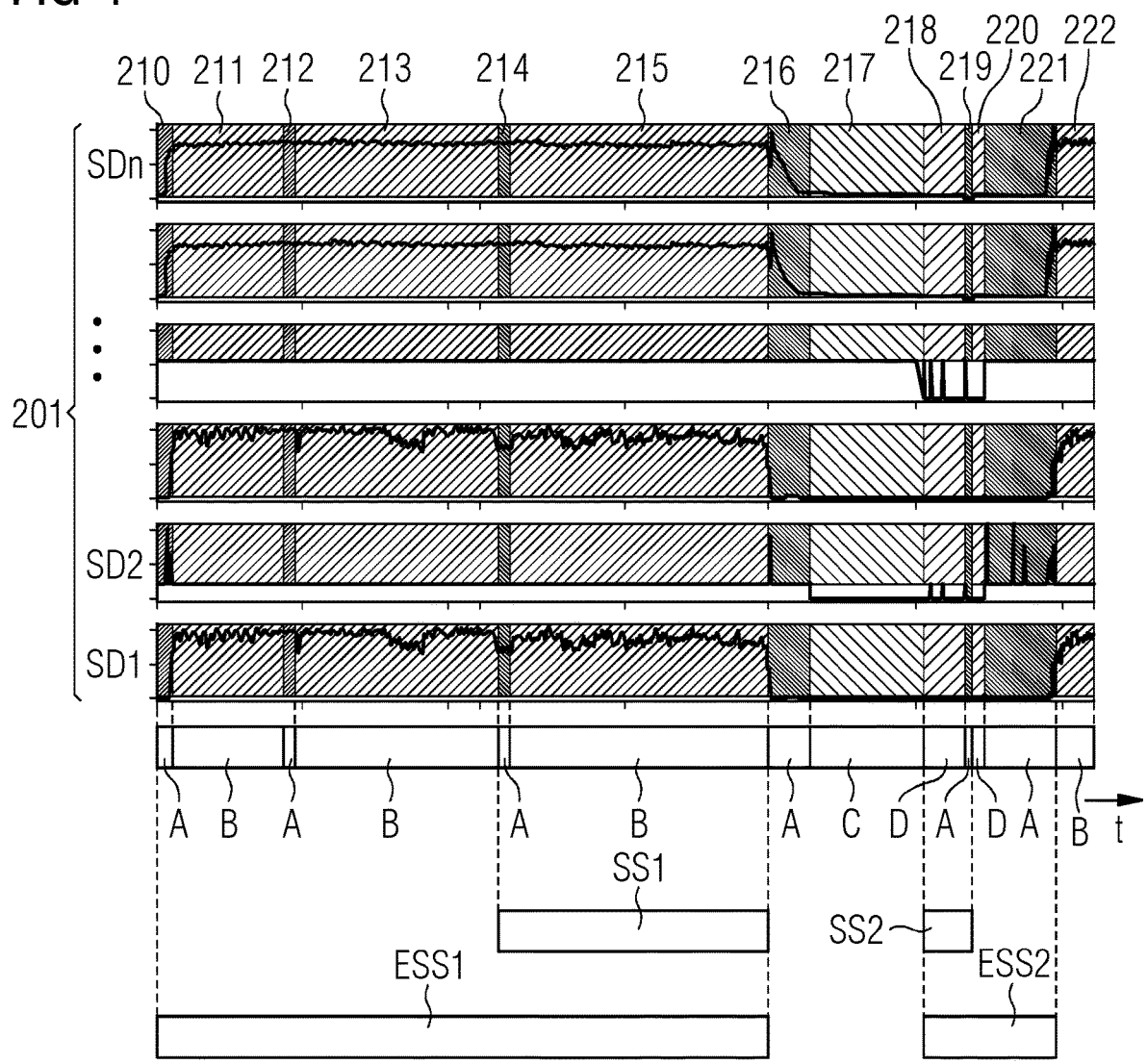
Figure 5:
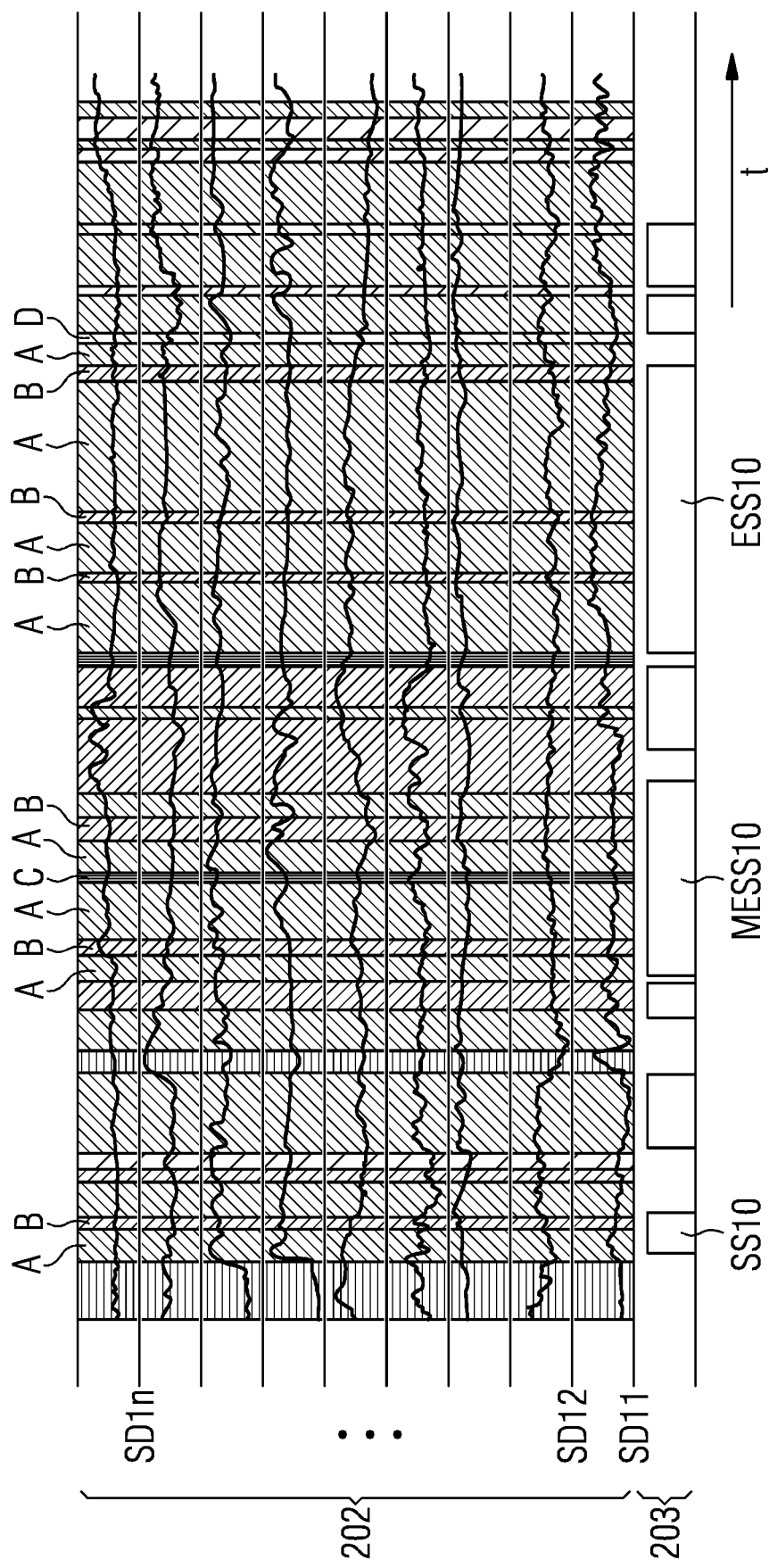
Figure 6:
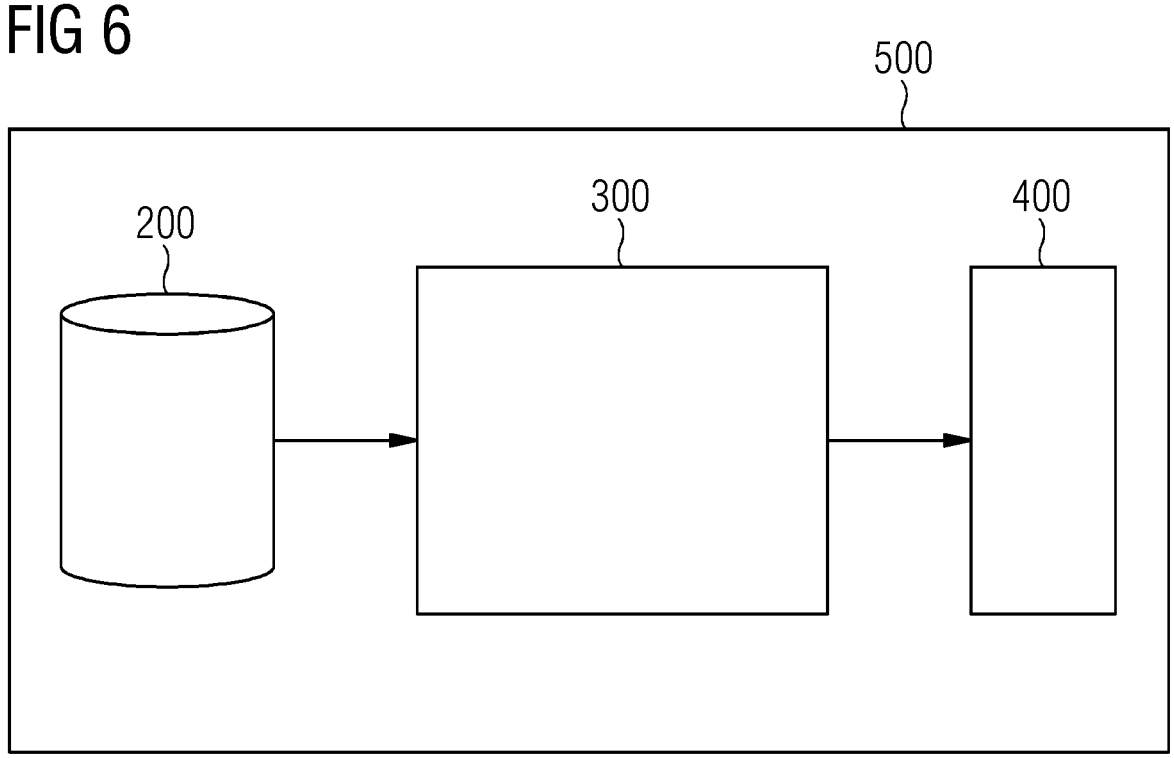

Some of the embodiments will be described in detail, with reference to the following figures, wherein like designations denote like members, wherein:

FIG. 1 schematically illustrates an application scenario for automatically generating training data;

FIG. 2 schematically illustrates an assistance device according to an embodiment of the present disclosure;

FIG. 3 shows the flowchart for illustrating a method according to an embodiment of the present disclosure;

FIG. 4 schematically illustrates the selection of subsequences of segments according to an embodiment of the present disclosure;

FIG. 5 shows historical temporal sensor data and the selected subsequences according to another embodiment of the present disclosure; and FIG. 6 shows a block diagram for illustrating structures of the technical system according to the present disclosure.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, devices, components, or other physical or functional elements could also be implemented by an indirect connection or coupling, e. g., via one or more intermediate elements. A connection or a coupling of elements or components can for example be implemented by a wire-based, a wireless connection and/or a combination of a wire-based and a wireless connection. Functional blocks can be implemented by dedicated hardware, by firmware, by software, and/or by a combination of dedicated hardware and firmware or software.

FIG. 1 shows an application scenario comprising a technical system 100, a data provision unit 200, an assistance device 300 and an AI-system 400. The technical system 100 can for example be a pump for oil and gas production, a turbine in a power plant, a mechanical, hydraulic or electrical drive-in heavy industry or production plants, or an electronic device like a controller or a field device in an automation system. Physical parameters, like pressure, temperature, vibration, throughput, of the technical system 100 are measured by sensors monitoring the technical system 100 over time. The sensor signals measured over time are further named time series of sensor data or in short temporal sensor data. Temporal sensor data can also indicate a derived parameter resulting from a combination of several sensor signals and representing a derived parameter of the technical system 100. The resulting one or several time series of sensor data is transmitted to and stored in the data provision unit 200, for example a database. The stored temporal sensor data is named historical temporal sensor data because the data was measured in the past. One example of historical sensor data is illustrated in FIG. 1 by reference 201.

The assistance device 300 is configured to receive the historical sensor data 201 and to divide the historical temporal sensor data 201 into segments and to assign a segment type out of a set of different segment types to each segment. At least one subsequence of segments is selected comprising of segments ordered according to a reference pattern and issued as output to be used as training data to train the artificial intelligence system 400 for detecting anormal behavior. Such a trained AI system can be used to monitor the same technical system 100 which delivered the historical temporal sensor data for generating the training data or it can be used to monitor a technical system similar to technical system 400.

The selected one or several subsequences of the historical temporal sensor data 201 represent the technical system 100 showing normal behavior. These subsequences are selected based on the assumption that the technical system 100 was operated in a normal mode very often and temporal sensor data representing the normal mode should appear very often in the obtained historical sensor data 201. In technical systems, e.g., industrial machines, the normal mode could be interpreted as a sum of successive sub-modes where the data distribution changes, but the sub-modes appear in the same order and repeatedly. According to that assumption the assistance device determines a reference pattern of a sequence of consecutive segment types which appear most frequently in all the historical temporal sensor data. Each segment represents a time window of temporal sensor data showing sensor data distribution characterized by one of several sub-modes and the assigned segment type represents the type of the sub-mode. The determined sequences of consecutive segment types are called neighborhood patterns.

The assistance device 300 selects a subsequence of segments which are ordered according to the reference pattern and outputs this subsequence of segments as training data which can be input into the AI-system 400 to train the AI-system for detecting anomalous behavior of the technical system 100 or a similar technical system.

The trained AI-system 400 can monitor the operation of the technical system 100, marked by the dashed arrow, in that temporal sensor data detected during current operation of the technical system 100 are obtained as input by the AI-system 400, which delivers a probability value indicating whether the technical system 100 is operating normal or anormal.

FIG. 2 shows the assistance device in more detail. The assistance device 300 comprises at least one processor configured such to form a data input interface 301, a selection unit 302, a data output interface 303, and a user interface 304. The data input interface 301 is configured to obtain historical temporal sensor data 201 for example in form of a sequence of vectors of temporal sensor data wherein each vector refers to a dedicated pointing time and the elements of the vector represent the sensor value of each of the monitored parameters measured by a sensor or sensor data derived from a combination of measured parameters.

The selection unit 302 processes the historical temporal sensor 201 data as described in more detail in FIG. 3 and transmits one or several selected subsequences of segments out of the historical temporal sensor data 201 via the data output interface 303 for applying as training data.

To adapt the selection unit 302 to historical sensor data of different technical systems which show different behavior and especially a different number of modes of normal behavior, the user interface 304 is configured to receive settings, for example values for a first and/or second number segments considered for evaluating a neighborhood.

The selection unit 302 is configured for performing the segmentation and selection of subsequences by apply AI-based functions.

The steps performed by the selection unit 301 and the respective method for automatically generating training data of temporal sensor data are shown in FIG. 3.

In a first step S1 historical temporal sensor data measured at the technical system 100 or a similar technical system is obtained via data input interface 301.

In step S2 the historical temporal sensor data is divided into a temporal sequence of segments. One segment type out of several different segment types is assigned to each of the segments. Each segment type is characterised by similar data distribution of temporal sensor data. The dividing of historical temporal sensor data into a temporal sequence of segments and the assigning of one segment type out of several different segment types to each segment is performed by applying an unsupervised segmentation algorithm on the historical temporal time series data.

In an example embodiment of the unsupervised segmentation algorithm, the algorithm divides the historical sensor data into units of sensor data and determines features, i.e., data sequences having similar data distribution, by dedicated feature definitions. Units having similar features are assigned to a cluster. The cluster is built based on a predefined probabilistic description model, a Hidden-Markov-model. Those units of sensor data showing the same state of the Hidden-Markov-model over a certain consecutive amount of time are assigned as a segment.

A further embodiment of the unsupervised segmentation algorithm applies feature based dynamic networks, wherein a relationship between two different sensors for each combination of two different sensors and for each time window is estimated by determining a matrix of a multivariate probabilistic model. Each precision matrix element represents the relationship between two sensors. The temporal course of the precision matrix elements is determined by solving an optimization problem under the constraints that the precision matrix shall be sparse, i.e. be a low-rank matrix, and the precision matrix element shall change smoothly over time.

In step S3 the selection unit 302 iterates through the detected segments to identify repeated sequences of segment types called neighborhood patterns. In detail, for each of segment, a neighborhood pattern of segment types comprising of the segment types of a first number of adjacent preceding segments and the segment type of the actually considered segment and the segment types of a second number of adjacent subsequent segments are determined and stored. In other words, for each segment the successor segments or more correct the segment type of the successor segment and the segment type of the processor segments are determined. As a result, there exists a history about its successor and predecessor segment types to each detected segment. The neighborhood pattern consists of at least two different segment types. The first number of adjacent preceding segments and the second number of adjacent subsequent segments can be predefined and adapted via the user interface 303.

In step S4 the most frequently occurring neighborhood pattern from all determined neighborhood patterns is determined as reference pattern. The reference pattern represents normal operation of the technical system. In other words, based on the history results, an AI-function of the selection unit 302 iterates through the detected predecessors' and successors' results and looks for segments which appear in the same order and frequently in the historical temporal sensor data 201. The detected neighborhood patterns are determined and cannot be extended manually any more from right or from the left side.

In step S5 at least one subsequence of segments out of the historical sensor data is selected which is ordered according to the reference pattern. In an embodiment, the selection of the subsequences of segments is performed by applying a Greedy algorithm dependent on the neighborhood pattern on the historical temporal sensor data. A Greedy algorithm solves a maximising problem and provides for the historical temporal sensor data as input the subsequence of temporal sensor data of maximum length in time, consisting only of segments according to the reference pattern and having no gap in time in between. That means the selected subsequence consists of segments of the historical sensor data showing the reference pattern without any gap in between the segments. If a segment of a segment type which is not part of the reference pattern or which is not in the order as prescribed in the reference pattern, follows a sequence of segments according to the reference pattern, the selected subsequence of segments is terminated.

Several reference pattern can be detected out of the neighborhood patterns. The criteria for a neighborhood pattern being a reference pattern is, e.g., a threshold value for the minimum share of occurrence of the considered neighborhood pattern in all determined neighborhood patterns for the historical temporal data.

The length, i.e., the temporal extension, of the selected subsequence of segments can be extended by concatenating several subsequences ordered according to the same reference pattern to an extended subsequence which is then output as training data. In the case when several reference patterns are determined the length of the subsequence can be extended by concatenating subsequences referring to different reference pattern. Details on the structure and content of a selected subsequence of segments are shown in FIG. 4.

In the last step S6 the subsequence of segments is output for applying the subsequence of segments as training data e.g. to an AI-system 400 as depicted in FIG. 1.

In a simplified manner, FIG. 4 shows at least a part of the historical temporal sensor data 201 divided into consecutive segments 211, . . . , 222. The historical temporal sensor data 201 consists, e.g., of several temporal sensor data SD1, . . . , SDn representing different parameters of the technical system. A segment type out of the segment types A, B, C, D is assigned to each of the segments 211, . . . , 222. For example, Segment type A is assigned to segment 211, segment type B is assigned to segment 212.

The neighborhood patterns are determined by considering for each segment the segment type of a first number of segments being adjacent and preceding to the considered segment, the segment type of the considered segment and the segment type of a second number of segments being adjacent and subsequent the considered segment. The minimum number of segment types in a neighborhood pattern is two. In the provided example, the first number is zero and the second number is one. In result a neighborhood pattern consists of two segment types, the segment type of the considered segment and the segment type of the adjacent subsequent segment. In FIG. 4, e.g., the detected neighborhood pattern for considered segment 211 is neighborhood pattern (A,B), for considered segment 212 the neighborhood pattern is (B,A), for considered segment 216 the neighborhood pattern is (AC), for considered segment 217 the neighborhood pattern is (C,D) and so on.

The neighborhood pattern (A, B) consisting of the ordered pair of segment types where in the segment type A succeeds the segment type B. This neighborhood pattern (A, B) is frequently found and determined as a reference pattern. Further on, neighborhood pattern (D, A) consisting of the ordered sequence of segment types D, A is determined as reference pattern that appear frequently. The detected reference patterns are subsequently mapped back to the historical temporal sensor data 201 by marking those segments which are ordered according to the reference patterns. A subsequence SS1 results from reference pattern (A, B) and comprises segment 211 and 212, a subsequence SS2 results from reference pattern (D, A) and comprises segment 218 and 219.

Segments of a segment type can be of various lengths, see e.g., segments 211, 216, 219, 221 of segment type B. Similar subsequences corresponding to the same reference pattern can show different length in time. In one option, the Greedy algorithm can determine the subsequence, which is longest in time, comprising only of one instance of segment ordered according to the reference pattern, for example SS1. In a second option the Greedy algorithm selects an extended subsequence of all adjacent subsequences ordered according to the same reference pattern. In FIG. 4 the segments 211, 212, 213, 214, 215 are concatenated to an extended subsequence ESS1, segments 218, 219, 220, 221 are concatenated to an extended subsequence ESS2. The subsequences ESS1, ESS2 are output as training data.

As a further option subsequences of different reference patterns are concatenated to form a mixed extended subsequence and this mixed extended subsequence is output as training data. In the example shown in FIG. 4 a mixed extended subsequence MESS1 selected by concatenating the extended subsequence ESS2 comprising two adjacent subsequences of the reference pattern comprising segment type D, A with a subsequence according to reference pattern (A, B) comprising segments 221, 222. Connecting parts of two concatenated subsequences of a mixed extended concatenated subsequence of temporal sensor data are reassembled to smoothen the transition between the different subsequences. Such a reassembling is performed in the example historical temporal sensor data 210 at the end of subsequence 13 between the segments 214 and 215.

FIG. 5 shows another embodiment of historical temporal sensor data 202 comprising of temporal sensor data SD11, temporal sensor data SD12 until temporal sensor data SDIn. The historical temporal sensor data 202 are segmented and a segment type is assigned to each segment indicated by different shading. Selected subsequences 203 of the historical temporal sensor data 220 are output as training data. In this embodiment two reference patterns were determined a first one comprising the ordered sequence types (A, B) and a second one comprising ordered sequence types (A, C). Subsequence SS10 comprises two segments according to the reference pattern (A, B). An extended subsequence ESS10 comprises several consecutive segments showing the reference pattern (A, B). A mixed extended subsequence MESS10 is generated by concatenating an extended subsequence of reference pattern (A, B) with a subsequence of a reference pattern (A, C) and with another extended subsequence of reference pattern (A, B). The connecting parts of concatenated subsequences are re-sampled to smoothen the data distribution in this part of the subsequence.

Each of the subsequence SS10, mixed extended subsequence MESS10 or extended subsequence ESS10 as well as the further subsequences marked as selected subsequences 203 can be output and used as training data.

FIG. 6 shows an embodiment of a training system 500 for training an artificial intelligence system 400 used for detecting anomalous behavior of a technical system, for example technical system 100 shown in FIG. 1. The technical system 500 comprises a data provision unit 200 configured to prepare and provide historical temporal sensor data which was measured at technical system 100 or a similar technical system, an assistance device 300 as described above in FIG. 2, and an artificial intelligence system 400. The artificial intelligence system 400 comprises of at least one processor configured to receive the subsequences of segments output by the assistance device 200 and applying the subsequences of segments to train an artificial intelligence function for detecting anomalous b a behavior. The resulting anomaly detection model learned a normal behavior of the technical system. In test phase of the anomaly detection model, every input temporal sensor data distribution which deviates strongly from the suggested training data will be classified as anomaly.

The training system 500 additionally provides means to select training data manually by a user interface, e.g., user interface 304. The user can manually mark the requested training data or adjust a proposed subsequences as attained automatically by an assistance device. An algorithm in the background merges these subsequences and memorises the combination of merging segments and applies it for later incoming data.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An assistance device for automatically generating training data of a time series of sensor data, further on called temporal sensor data, applied to train an Artificial Intelligence system used for detecting anomalous behavior of a technical system, comprising at least one processor configured to perform:
   receiving, from a plurality of sensors, by one or more processors of a computer system, sensor signals comprising historical temporal sensor data measured at said technical system;
   dividing, by the one or more processors, the sensor signals into a temporal sequence of segments and assigning, by the one or more processors, one segment type out of several different segment types to each segment, wherein each segment type is characterized by a data distribution of temporal sensor data, wherein said dividing and assigning comprises: applying an unsupervised segmentation algorithm on the historical temporal sensor data within the sensor signals to assign units of the sensor signals whose included historical temporal sensor data has features of a cluster built from a Hidden-Markov-model, wherein each unit of the sensor signals showing a same state of the Hidden-Markov-model over a same interval of time is assigned as a segment of the temporal sequence of segments;
   training, by the one or more processors, the Artificial Intelligence system using one or more subsequences of the segments as training data for performing said training,
   wherein, for each segment, there are neighborhood patterns of segment types including a neighborhood pattern of the segment type of the segment and the segment types of a first number of adjacent preceding segments and a neighborhood pattern of the segment type of the segment and the segment types of a second number of adjacent subsequent segments,
   wherein each neighborhood pattern has at least two different segment types,
   wherein a reference pattern for normal operation of the technical system is a most frequently occurring neighborhood pattern of the neighborhood patterns for the segments,
   wherein each subsequence of the one or more subsequences of the segments used as training data for performing said training comprises the reference pattern.

2. The assistance device according to claim 1, further comprising a user interface configured to receive the first and second number from a user.

3. The assistance device according to claim 1, wherein the segments of each segment type can be of various temporal length.

4. The assistance device according to claim 1, wherein several subsequences ordered according to the same reference pattern are concatenated to an extended subsequence and the extended subsequence is output as training data.

5. The assistance device according to claim 1, wherein at least two different reference patterns are determined and a separate subsequence of segments is selected for each of the different reference pattern and each of the subsequences is outputted, wherein each subsequence comprises segments ordered according to the respective reference pattern.

6. The assistance device according to claim 5, wherein subsequences of different reference patterns are concatenated to form a mixed extended subsequence and the mixed extended subsequence is output.

7. The assistance device according to claim 6, wherein connecting parts of two concatenated subsequences of a mixed extended concatenated subsequence of temporal sensor data are re-sampled to smoothen the transition between the subsequences.

8. A training system for training an Artificial Intelligence system used for detecting anomalous behavior of a technical system comprising:
   a data provision unit configured to prepare and provide historical temporal sensor data which was measured at said technical system,
   an assistance device according to claim 1, and
   the Artificial Intelligence System comprising at least one processor configured for receiving a subsequence of segments out of the historical temporal sensor data, and applying the subsequence of segments to train an artificial intelligence function for detecting anomalous behavior.

9. A method for automatically generating training data of a time series of sensor data, further on called temporal sensor data, applied to train an Artificial Intelligence system used for detecting anomalous behavior of a technical system, comprising:
   receiving, from a plurality of sensors, by one or more processors of a computer system, sensor signals comprising historical temporal sensor data measured at said technical system;
   dividing, by the one or more processors, the sensor signals into a temporal sequence of segments and assigning, by the one or more processors, one segment type out of several different segment types to each segment, wherein each segment type is characterized by a data distribution of temporal sensor data, wherein said dividing and assigning comprises: applying an unsupervised segmentation algorithm on the historical temporal sensor data within the sensor signals to assign units of the sensor signals whose included historical temporal sensor data has features of a cluster built from a Hidden-Markov-model, wherein each unit of the sensor signals showing a same state of the Hidden-Markov-model over a same interval of time is assigned as a segment of the temporal sequence of segments;
   training, by the one or more processors, the Artificial Intelligence system using a subsequence of the segments as training data for performing said training,
   wherein, for each segment, there are neighborhood patterns of segment types including a neighborhood pattern of the segment type of the segment and the segment types of a first number of adjacent preceding segments and a neighborhood pattern of the segment type of the segment and the segment types of a second number of adjacent subsequent segments,
   wherein each neighborhood pattern has at least two different segment types,
   wherein a reference pattern for normal operation of the technical system is a most frequently occurring neighborhood pattern of the neighborhood patterns for the segments,
   wherein each subsequence of the one or more subsequences of the segments used as training data for performing said training comprises the reference pattern.

10. A computer program product, comprising a computer readable hardware storage device having computer readable program code stored therein, said program code executable by a processor of a computer system to implement a method directly loadable into the internal memory of a digital computer, comprising software code portions for performing the steps of claim 9 when the product is run on the digital computer.

11. The assistance device according to claim 1, wherein the one or more subsequences comprise one subsequence of the reference pattern.

12. The assistance device according to claim 1, wherein the one or more subsequences comprise a concatenation of two or more subsequences of the reference pattern.

13. The method according to claim 9, wherein the one or more subsequences comprise one subsequence of the reference pattern.

14. The method according to claim 9, wherein the one or more subsequences comprise a concatenation of two or more subsequences of the reference pattern.

* * * * *